(No Model.) 3 Sheets—Sheet 2.
W. D. PATTERSON.
OVERHEAD ELECTRIC RAILWAY.
No. 497,337. Patented May 16, 1893.
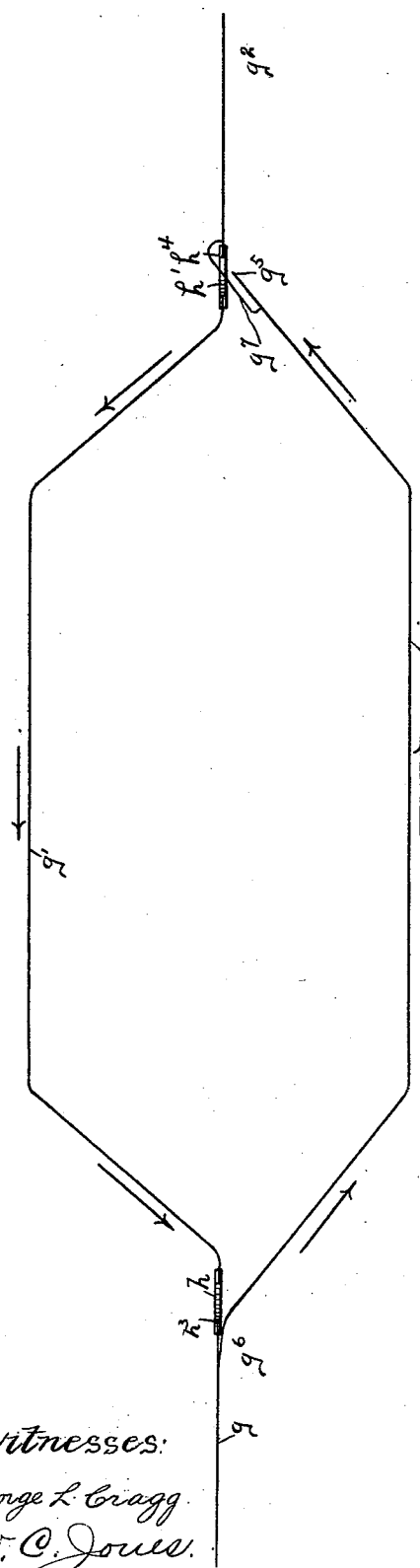
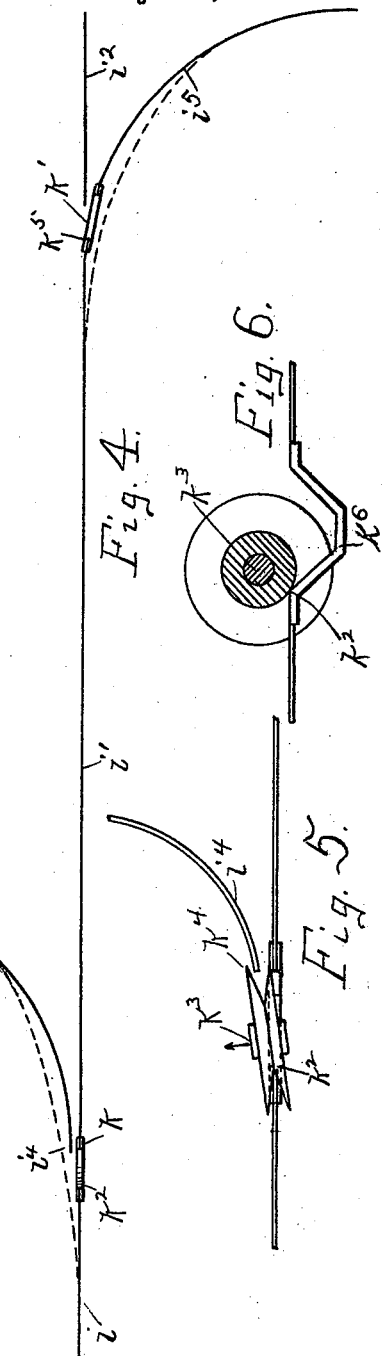
Witnesses:
George L. Cragg
W. C. Jones
Inventor
William D. Patterson
By Barton & Brown
Attys (No Model.) 3 Sheets—Sheet 3.
W. D. PATTERSON.
OVERHEAD ELECTRIC RAILWAY.
No. 497,337. Patented May 16, 1893.
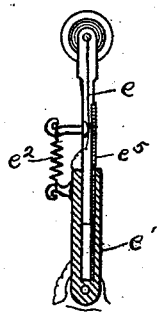
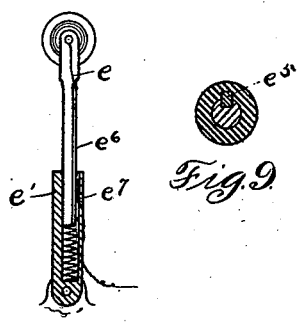
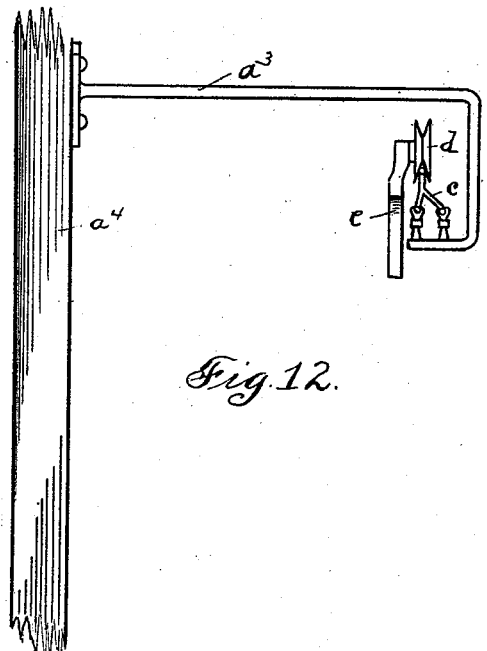
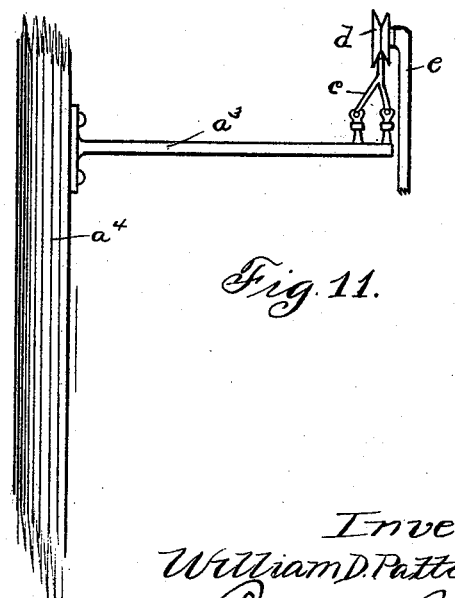
Witnesses
George L. Cragg.
W. Clyde Jones.
Inventor
William D. Patterson
By Barton & Brown
Att'ys
THE NORRIS PETERS CO., PHOTO-LITHO., WASHINGTON, D. C.

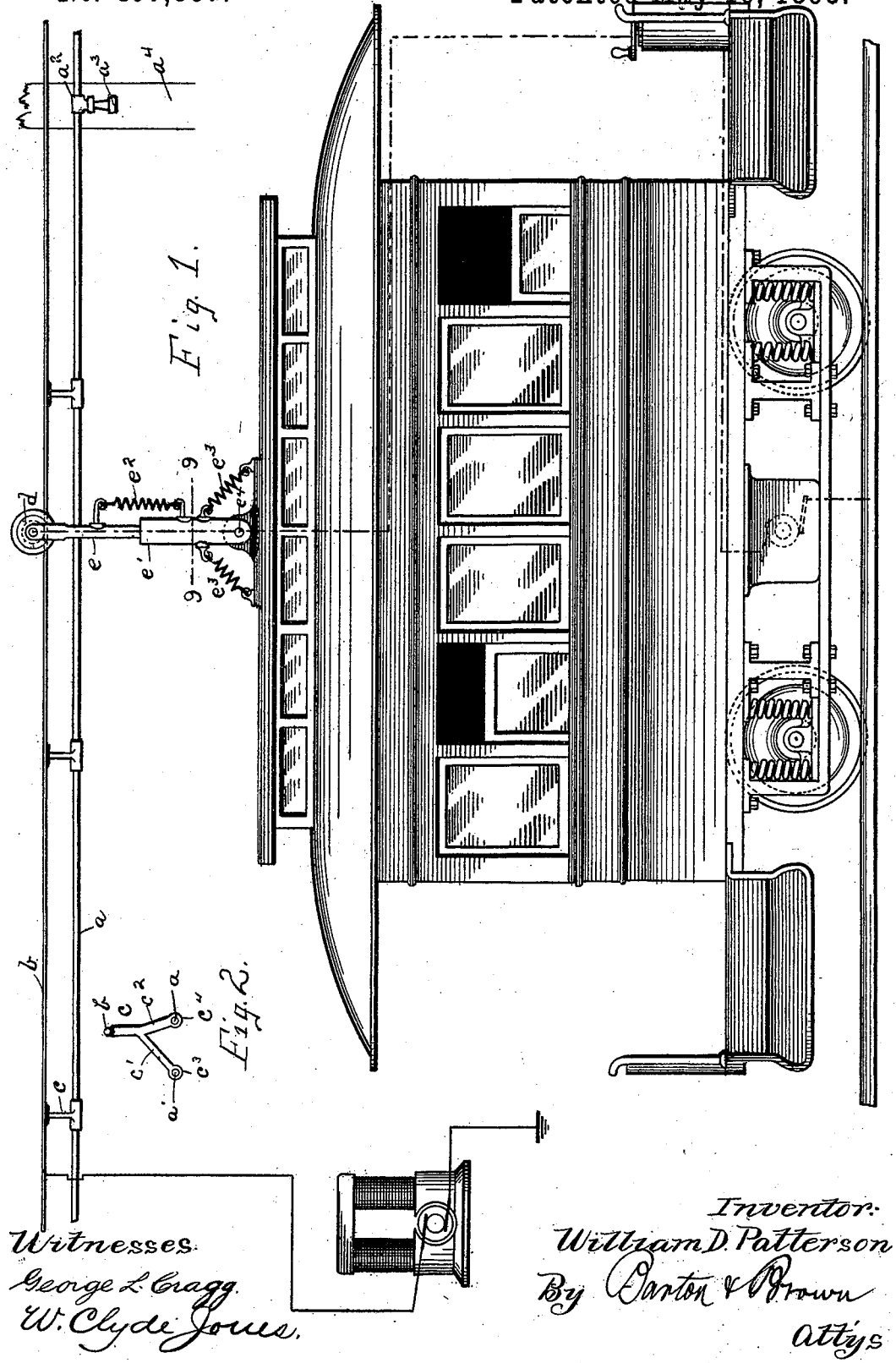

UNITED STATES PATENT OFFICE.

WILLIAM D. PATTERSON, OF KEOKUK, IOWA.

OVERHEAD ELECTRIC RAILWAY.

SPECIFICATION forming part of Letters Patent No. 497,337, dated May 16, 1893.

Application filed November 1, 1892. Serial No. 450,613. (No model.)

*To all whom it may concern:*

Be it known that I, WILLIAM D. PATTERSON, a citizen of the United States, residing at Keokuk, in the county of Lee and State of Iowa, have invented a certain new and useful Improvement in Overhead Trolley Systems for Electric Railways, (Case No. 1,) of which the following is a full, clear, concise, and exact description, reference being had to the accompanying drawings, forming a part of this specification.

My invention relates to an overhead trolley system for electric railways.

The objects of my invention are, first, to provide an overhead trolley system in which the trolley wheel bears upon the top of the trolley wire; second, to provide a means for supporting the trolley wire whereby the strain thereon may be a minimum; and, third, in various details of construction hereinafter described and claimed.

My object is to provide a system which shall not be subject to the disadvantages consequent upon overhead trolley systems as now constructed and used. By my invention I overcome the necessity of removing the trolley from the wire whenever it is desired to reverse the direction of motion of the car, as must be done when the trolley bears upon the under side of the wire and the trolley supporter or pole rests at an angle to the vertical. I also overcome the necessity of momentarily removing the trolley from the wire upon passing a switch when it is desired to pass from the course of a straight line, and further I overcome many of the difficulties consequent upon overhead systems as previously in operation.

By my invention the trolley bears upon the upper side of the wire and is supported preferably upon a telescoping arm which yieldingly holds the trolley firmly against the wire and compensates for irregularities in the road bed. Switches upon the trolley wires are provided whereby the trolley wheel will pass to the proper wires, the travel of the trolley wheel being dependent upon the plane of motion of the car at the moment the trolley wheel reaches the switch.

I further provide two supporting wires carried upon the brackets or cross suspension wires, said wires preferably being in the same horizontal plane and at some distance apart. Upon these wires is carried the trolley wire supported upon posts attached to said supporting wires at short intervals. By this means the strain is removed from the trolley wire and is taken up by the supporting wires which may be made of any material of the necessary strength, and at the same time, if desired, may be utilized as conductors of electricity.

My invention will be more readily understood by reference to the accompanying drawings, in which—

Figure 1 is a view in elevation of a car showing the means of applying my invention thereto, the electric circuits being shown diagrammatically. Fig. 2 is an end view showing the posts that are supported upon the supporting wires and which carry the trolley wire. Fig. 3 is a diagrammatic view of the trolley wire at a passing switch of a single track railway. Fig. 4 is a diagrammatic view of the trolley wire showing switches passing respectively to the left and to the right of the main line. Fig. 5 is a plan view of the trolley wheel at a switch, showing the same as about to leave the main line. Fig. 6 is an elevation thereof, the trolley wheel being shown in section. Fig. 7 is a detail view of the telescoping trolley support. Fig. 8 is a modification thereof. Fig. 9 is a sectional view of the trolley supporter upon line 9—9 Fig. 1. Fig. 10 is a sectional view of a modification thereof showing the arm as rectangular. Fig. 11 is a view in elevation of a bracket for supporting the trolley wire, the trolley supporter passing upon the outside of the trolley wire, the wires being shown in section. Fig. 12 is a similar view showing the trolley supporter as passing between the trolley wire and the pole.

Like letters refer to like parts in the several figures.

Referring to Figs. 1 and 2, $a$ is one of the supporting wires carried upon a suitable insulator $a^2$ which is provided upon the bracket $a^3$ supported upon a pole $a^4$. A second supporting wire $a'$ lies in the same horizontal plane with the wire $a$ and is likewise supported upon an insulator carried upon the bracket $a^3$. Upon the wires $a$ and $a'$ are carried the posts $c$ provided each with two legs or members $c'$ and $c^2$ which carry upon their ends sleeves or eyes $c^3$, $c^4$, adapted to receive the supporting wires $a'$ and $a$ respectively. These wires are adapted to pass freely through the eyes so that the posts are free to move back and forth upon the wires $a$ and $a'$. To the upper ends of the posts is rigidly attached the trolley wire proper, an elongation being provided on the post to which the wire may be soldered or otherwise connected. It is immaterial in what manner the supporting wires be suspended; I have shown them as carried upon brackets attached to the poles, but other means could readily be devised to meet the exigencies of the case without departing from my invention.

The trolley wheel $d$ is adapted to move upon and make contact with the upper side of the trolley wire $b$, and it is journaled upon the end of the arm $e$ of the trolley supporter, which arm fits and slides in the bore of the barrel $e'$. The arm $e$ is given a yieldingly downward pressure which I preferably accomplish by providing projections upon the arm and the barrel which are connected by a coiled spring $e^2$.

Fig. 8 shows a modification in which a coiled spring is placed between the lower end of the arm $e$ and the bottom of the bore of the barrel. It is evident, however, that this yielding downward tendency of the arm $e$ may be accomplished in a variety of ways. The barrel $e'$ is held yieldingly in an upright position by springs $e^2$, $e^3$, or their equivalent, and is journaled at $e^4$ to a casting carried upon the top of the car so that it is free to move in one plane, that of the motion of the car, while rotary motion is prevented. I preferably construct this journal so that a slight motion perpendicular to the motion of the car may be permitted. The arm $e$ is provided with a spline $e^5$ which is adapted to slide in a key way cut in the barrel $e'$ so that a rotary motion of the arm relatively to the barrel is prevented.

Fig. 9 shows a modification in which the lower portion of the arm $e$ is made rectangular. Thus it will be seen that the trolley wheel will always remain approximately in the plane of the car, but is free to move in that plane.

The electrical connection between the trolley wheel and the car may be, as shown in Fig. 7, by a wire running from the bearing of the trolley wheel down the arm $e$ and the barrel $e'$ and passing from one movable part to another by means of coils of wire. Another method of connection is shown in Fig. 8 in which a metallic bar $e^6$ is carried upon the arm $e$ and adapted to slide upon a block $e^7$ upon the barrel $e'$, the bar $e^6$ being connected with the trolley wheel and the block $e^7$ with the car. By this arrangement the trolley wheel will always bear with an almost constant pressure upon the trolley wire and the tension of the springs $e^3$, $e^3$ is so adjusted that the trolley supporter will remain nearly vertical so that the motion of the car may be reversed without removing the trolley wheel from the wire and without attention from the attendant.

I preferably make the post $c$ with the leg $c^2$ upon the side along which the trolley supporter passes, more nearly vertical than the arm $c'$, away from the said trolley supporter whereby the arm $e$ of the supporter may pass as close to the trolley wire as possible. Thus the wire $a$, being more directly beneath the trolley wire, will receive most of the pressure from the trolley wire and, consequently, should be of greater tensile strength. This fact enables me, when it is desirable, to use the wire $a'$, upon which but little strain need exist, as a feeder wire for carrying the current from the generator, said feeder wire being connected at proper intervals with the trolley wire through the posts $c$ $c$ or separate connecting wires. Such a construction is very advantageous, for in overhead trolley systems as now constructed the trolley wire, which is only supported at long intervals, must be made of sufficient strength to resist the tensile pull caused by its own weight, for which purpose some material is often used or added to the copper to increase its tensile strength, but such addition decreases the conductivity, for which reason it is necessary to use a feeder wire. By my construction, the wire being supported at short intervals, the tension caused by the weight of the wire may be almost entirely done away with and, consequently, only enough impurity need be added to the copper to prevent too rapid wear of the trolley wire by the friction of the trolley wheel. The trolley wire may then be given such a cross section that it may carry the entire current without the aid of a feeder wire, or, as was before mentioned, the supporting wire which carries the least load may be used as a feeder wire. Another advantage to be derived from this construction is that the supporting wires may be drawn up to any degree of tightness to remove the sag between the points of support without affecting the tension upon the trolley wire proper, since the supporting wires are adapted to fit freely in the eyes provided in the legs of the posts. After the supporting wires have thus been drawn up the trolley wire may be drawn up independently and to the desired degree.

I will next describe the switches for passing from one track to another, and first such switches as will be used at passing tracks upon a single track railway.

Referring to Fig. 3, $g$, $g'$, $g^2$ and $g^4$ are sections of the trolley wire, and a car coming from the right of the figure toward the left will, upon coming to the passing tracks, take the one to the right, and the trolley will pass from the section $g^2$ to the section $g'$. A car passing from the left of the drawing to the right will take the track to the right of its course and its trolley wheel will pass from the section $g$ to the section $g^4$. To accomplish this passage of the trolley to the proper section I provide breakers $h\ h'$, shown in elevation in Fig. 6, whose lower sides or bottoms $K^6$ are at a greater distance below the top of the trolley wire than is the periphery of the flange of the trolley wheel. By this means the trolley when properly directed may be permitted to pass from the trolley wire along which it has been traveling. Supposing a car to be traveling from the right to the left, when the trolley reaches the breaker $h'$ it will continue its course passing said breaker and passing to section $g'$, the arm $e$ of the trolley supporter passing between the breaker $h'$ and the end $g^5$ of the section $g^4$, said end being rigidly held at such a distance from the breaker $h'$ that the arm $e$ may freely pass through. When the car shall have again reached the main track and the trolley has reached the breaker $h$, the flange of the trolley passing between the breaker $h$ and the end $g^6$ of the section $g^4$ will cause said end $g^6$, which is yieldingly pressed against the section $g$, to move away from said section and permit the flange of the trolley and the trolley supporter to pass through, after which it will again close upon said section $g$. Again, suppose a car to be passing from the left to the right. As the trolley reaches the end $g^6$ of the section $g^4$, which is lying against section $g$, it will straddle the end $g^6$ and when the trolley has passed the end $h^3$ of the section $g$, the trolley will pass to the section $g^4$. When the trolley reaches the end $g^5$ of said section the flanges of the trolley will have straddled the end $h^4$ of section $g^2$ and the trolley will pass to section $g^2$. The ends $g^5$ and $g^6$ of the section $g^4$ may be connected to the main trolley wire in any convenient manner, so that it will not interfere with the trolley or trolley supporter. Such a connection I have represented by the wire $g^7$ which attaches to the under side of the wire $g^4$, passes downward to a point beneath the periphery of the flange of the trolley, curves upward and passes across the breaker $h'$ at such a height that the trolley may pass beneath, then passes down below the lowest point of the trolley and bends upward again to attach to the under side of the wire $g^2$.

Referring to Fig. 4, $i$, $i'$ and $i^2$ are sections of the main line trolley wire, and $i^3$ and $i^4$ are sections of branches turning respectively to the left and the right. If a car be traveling from left to right the trolley will pass from the section $i$ to section $i'$ across breaker $k$, the trolley supporter passing between breaker $k$ and the end $i^4$ of section $i^3$; when the trolley reaches breaker $k'$ one flange thereof will pass between the ends of the breaker and the trolley will pass to the section $i^2$. If the car be passing from right to left the reverse operation will take place. The breaker $k$ is not placed directly above the switch upon the track, but is placed in such a position that when the switch is thrown the car will have passed upon the side track a short distance before the trolley reaches the breaker $k$. The dotted lines in Fig. 4 represent the center lines of the side tracks showing how the track begins to diverge from the main line in advance of the trolley wire. This passage of the car upon the side track will cause the car to take an angular position relatively to the main line trolley so that the trolley wheel will experience a twist tending to cause it to assume the angle of the car. When the trolley wheel reaches the point $k^2$ of the breaker $k$ it will be resting upon a single point, the point $k^2$, as shown more clearly in Figs. 5 and 6, and the force acting upon the wheel at its center tends to move said center in the direction indicated by the arrow, and in consequence the wheel will swing about the point $k^2$ as an instantaneous center, and the flange $k^4$ of the trolley wheel will thus be thrown to the left to such a distance that, as the trolley wheel continues its motion the flange of the wheel will straddle the end $i^4$ of the section $i^3$ and pass thereon. If the trolley wheel be traveling upon the section $i^3$ toward breaker $k$, the trolley wheel upon leaving said section at the end $i^4$ thereof will pass directly to section $i$ by straddling the end $k^2$ of said section.

Supposing the car traveling along the main line with the trolley wheel passing over section $i'$ and it is desired to turn to the right so that the said trolley may pass upon section $i^5$. In this case as in the last the switch of the track is placed in advance of the breaker $k'$ so that when the trolley reaches the breaker $k'$ it has a tendency of its forward end to move to the right so that when the trolley reaches the point $k^5$ of the breaker $k'$ it will turn upon said point as a center so that its flanges will straddle the end of section $i^5$ as it continues its motion, and will pass to said section.

If the trolley be traveling upon section $i^5$ toward breaker $k'$ the trolley as it leaves the end of said section will straddle end $k^5$ of section $i'$ and pass thereto.

Thus it will be seen that my invention may be applied to any system of tracks and switches the particular positions of the breakers depending upon the particular requirements of the case. By this construction it is possible to provide a trolley system in which the trolley need never be removed from the trolley wire, nor indeed does it need any attention at all, the position assumed by and the motion of the car at the switch causing the trolley wheel automatically to pass to the proper trolley wire.

Having thus described my invention, what I claim as new, and desire to secure by Letters Patent, is—

1. The combination with parallel wires supported above the track, of posts carried thereby, and a trolley wire carried upon said posts, substantially as described.

2. The combination with wires supported above the track in substantially the same horizontal plane, of posts carried upon said wires, and a trolley wire carried upon said posts, substantially as described.

3. The combination with wires supported above the track in substantially the same horizontal plane, of posts, carried upon said wires and free to move longitudinally thereon, and a trolley wire carried upon said posts, substantially as described.

4. The combination with wires supported above the track in substantially the same horizontal plane, of posts, free to move longitudinally, supported thereby, and a trolley wire carried upon said posts whose center of gravity falls between said wires, but nearer one than the other, substantially as described.

5. The combination with a trolley wire, of a trolley wheel adapted to travel upon the upper surface of said wire, and breakers interposed between sections of said wires, the bottoms of said breakers being at a greater distance from the top of the trolley wire than is the periphery of the trolley wheel; whereby the trolley wheel may be permitted to pass from said wire, substantially as described.

6. The combination with a trolley wire, of a trolley wheel adapted to travel upon the upper surface of said wire, breakers interposed between sections of said wire, the ends of sections not connected by said breakers being at a distance from said breakers greater than the thickness of the trolley wheel supporter; whereby the trolley wheel may pass from or continue upon the line as desired, substantially as described.

7. In a passing switch, the combination with the sections $g$, $g'$, $g^2$ of the trolley wire, of the breakers $h$ and $h'$ interposed between said sections, and the section $g^4$ whose end $g^5$ is at such a distance from the breaker $h'$ that the trolley supporter may readily pass through, and whose end $g^6$ is yieldingly held against section $g$, substantially as described.

8. In a switch passing from the side of the trolley wire upon which the trolley supporter carrying a downward pressing trolley wheel travels, the combination with the sections $i$, $i'$ of the main line trolley wire, of the breaker $k$ interposed between said sections, the switch trolley wire $i^3$ whose end $i^4$ is at a greater distance from the breaker than the width of the trolley supporter, the point $k^2$ of the breaker being a continuation of the curve passing through the end $i^4$ of said section $i^3$; and the switch upon the railway track placed in advance of said trolley switch, for the purpose set forth, substantially as described.

9. In a switch passing from the opposite side of the trolley wire from that upon which the trolley supporter carrying a downward pressing trolley wheel travels, the combination with the main line sections $i'$, $i^2$ having an opening between them sufficient to permit the passage of the trolley supporter, of the switch section $i^5$, breaker $k'$ between said section and section $i'$, and the switch upon the railway track, placed in advance of said trolley switch for the purpose set forth, substantially as described.

10. The combination with a trolley wire, of a trolley wheel adapted to travel upon the upper side of said trolley wire, switches upon the trolley wire comprising breakers interposed between sections of said trolley wire, lying upon the side of the trolley supporter upon which said trolley wheel is carried, the ends of all sections lying on the opposite side being at a distance from said breakers greater than the thickness of said trolley supporter, and switches upon the railway track placed in advance of said trolley wire switches; whereby when the track switches are properly set the trolley wheel may automatically pass to the proper trolley wire, substantially as described.

In witness whereof I hereunto subscribe my name this 24th day of October, A. D. 1892.

WILLIAM D. PATTERSON.

Witnesses:
   I. N. TICHENOR,
   J. G. GARRETSON.